United States Patent [19]

Miyata

[11] Patent Number: 5,117,499
[45] Date of Patent: May 26, 1992

[54] DATA FLOW TYPE PROCESSING APPARATUS HAVING EXTERNAL AND CACHE MEMORIES FOR FETCHING PAIRED EXECUTING INSTRUCTION WHEN MISHIT OCCURS

[75] Inventor: Souichi Miyata, Nara, Japan

[73] Assignee: Sharp Kabushiki Kaisha, Osaka, Japan

[21] Appl. No.: 299,772

[22] Filed: Jan. 19, 1989

[30] Foreign Application Priority Data

| Jan. 22, 1988 | [JP] | Japan | 63-12790 |
| Jan. 22, 1988 | [JP] | Japan | 63-13279 |
| Jan. 22, 1988 | [JP] | Japan | 63-13280 |

[51] Int. Cl.⁵ .......................... G06F 9/30; G06F 9/00
[52] U.S. Cl. .................... 395/800; 364/DIG. 1; 364/DIG. 2; 364/231.8; 364/232.22; 364/243.3; 364/244.6; 364/243.42; 364/259.2; 364/262.4; 364/946.2; 364/948.34; 364/964.2; 364/964.22; 364/964.23; 364/964.24; 364/964.26; 364/964.7
[58] Field of Search ... 364/200 MS File, 900 MS File

[56] References Cited

U.S. PATENT DOCUMENTS

| 4,591,979 | 5/1986 | Iwashita | 364/200 |
| 4,594,660 | 6/1986 | Guenthner et al. | 364/200 |
| 4,620,275 | 10/1986 | Wallach et al. | 364/200 |
| 4,675,806 | 6/1987 | Uchida | 364/200 |
| 4,811,215 | 3/1989 | Smith | 364/200 |
| 4,860,191 | 8/1989 | Nomura et al. | 364/200 |
| 4,864,491 | 9/1989 | Ohuchi | 364/200 |
| 4,918,644 | 4/1990 | Terada et al. | 364/900 |
| 4,943,916 | 7/1990 | Asano et al. | 364/200 |
| 4,953,082 | 8/1990 | Nomura et al. | 364/200 |

OTHER PUBLICATIONS

Pramanik et al., "A Hardware Pattern Matching Algorithm On A Dataflow"; The Computer Journal, vol. 28, No. 3, 1985, pp. 264-269.

*Primary Examiner*—Thomas C. Lee
*Assistant Examiner*—Krisna Lim

[57] ABSTRACT

A data flow type information processing apparatus comprises a program control portion, a paired data detecting portion, an ALU and an external program memory. When the paired data detecting portion determines that program data and data to be processed to be paired are read out from a program storing portion, the data flow type information processing apparatus accesses the external program memory, transmits program data to be processed and non-processed data to the ALU and fetches a subsequent instruction for the operation processing result data of the ALU with respect to the program storing portion. If a mishit occurs in fetching of the instruction, the subsequent instruction is accessed directly together with the data to be processed with respect to the external program memory and executes fetching of the instruction with high efficiency.

8 Claims, 15 Drawing Sheets

DATA FLOW TYPE PROCESSING APPARATUS HAVING EXTERNAL AND CACHE MEMORIES FOR FETCHING PAIRED EXECUTING INSTRUCTION WHEN MISHIT OCCURS

BACKGROUND OF THE INVENTION

1. Field of the Invention

The present invention relates to data flow type information processing apparatus. More particularly, the present invention relates to an information processing apparatus of a data flow type which performs operations upon arrival of data and which includes a program memory for storing data flow programs, provided outside a processing section.

2. Description of the Background Art

Conventional computers are for the most part von Neumann computers which store various instructions as programs in a program memory, access the instructions successively by sequentially designating addresses of the program memory by means of a program counter, and execute those instructions.

On the other hand, data flow type computers are of a type different from the von Neumann computers, which do not have the concept of sequential execution of instructions by using a program counter. Such a data flow type computer has an architecture in which instructions are processed in parallel, in principle. More specifically, whenever data to be processed is supplied, instructions can be executed and since a plurality of instructions are simultaneously executed on the data, the program can be executed in parallel according to the natural flow of the data. Thus, in such a data flow type computer, the time required for operation processing is considerably reduced.

FIG. 14 is a schematic block diagram of a conventional data flow type computer and FIG. 15 is an illustration showing part of contents stored in a program memory.

Referring to FIGS. 14 and 15, construction and operation of the conventional data flow type computer will be roughly described. In FIG. 14, a program storing portion 100 includes a program memory (not shown) which stores a data flow program including contents of destination fields of input data packets (destination information) and instruction information as shown in FIG. 15. The program storing portion 100 reads out the destination information and the instruction information by address designation based on the destination information, and stores respective information in a destination field and an instruction field of the input data packet so as to output the information.

A paired data detecting portion 200 queues data packets inputted from the program storing portion 100 and it stores operand data of one of the two data packets where a hit of destination information occurs, into a data field of the other data packet and outputs that operand data An operation processing portion 300 decodes instruction information of the data packet transferred from the paired data detecting portion 200, and performs predetermined processing for the two operand data, so that it stores the result in an input data field of the input data packet and outputs the result to the program storing portion 100.

In the data flow type information processing apparatus shown in FIG. 14, operation processing based on the program stored in the program storing portion 100 is performed while the data packets circulate in the program storing portion 100, the paired data detecting portion 200, the operation processing portion 300, the program storing portion 100 etc.

FIG. 16 is a diagram showing a schematic construction of the program storing portion shown in FIG. 14. In FIG. 16, an input data latch 101 maintains present destination information and instruction information is erased. The input data latch 101 also latches operand data. The destination information latched in the input data latch 101 is supplied to an address calculating portion 102 and an address of the program memory 103 is calculated based on the destination information. The program memory 103 stores the data flow program including the destination information and the instruction information as shown in FIG. 15. New destination information and instruction information read out from the program memory 103 are supplied to and latched at an output data latch 104. The output data latch 104 latches, as it is, the operand data latched in the input data latch 101.

In the above described conventional data flow type computer shown in FIGS. 14 to 16, the portions for reading out the instruction information of the program are all in the program storing portion 100 (which has been manufactured in advance and where it is impossible to add or remove any portions) and accordingly it is necessary to provide a memory having a capacity for storing all the programs. However, in general, it is difficult to provide an appropriate capacity for a program memory in a computer irrespective of whether it is formed by a plurality of semiconductor components or by a single LSI (large scale integration) chip, and a flexible hardware structure cannot be adopted according to the program to be executed.

Therefore, it may be considered to externally provide the program memory 103 for the program storing portion 100, thereby to suitably increase or decrease the capacity of the program memory 103. However, if the program memory 103 is externally provided, difficulty is involved as to how to access a cache memory contained in place of the program memory portions 102 and 103 and the external program memory 103.

SUMMARY OF THE INVENTION

Therefore, a principal object of the present invention is to provide a data flow type computer having a program memory of a large capacity provided outside a program storing portion and being capable of accessing a cache memory contained in the computer at high speed.

Another object of the present invention is to provide a data flow type information processing apparatus capable of executing efficiently instruction fetch by using a cache program memory and an external program memory.

Briefly stated, the present invention is a data flow type information processing apparatus having a program control portion, a paired data detecting portion, an operation processing portion and an external program storing portion. This data flow type information processing apparatus is constructed to carry out operation in the following manner. The program control portion accesses the external program storing portion when the paired data detecting portion determines that program data and data to be processed, which are to be paired, are read out from the external program storing portion, and it transmits the program data and the data to be processed to the operation processing portion. Then, the program control portion fetches, from the cache program memory, a next instruction for processing data of the operation processing portion and when a mishit of the fetch instruction occurs, the next instruction as well as the data to be processed is directly accessed from the external program storing portion.

Therefore, according to the present invention, if a hit occurs in the cache program memory, a necessary instruction is fetched and a next instruction is uploaded from the external program storing portion, whereby instructions are successively fetched. If a mishit occurs, the external program storing portion is directly accessed so that data is read out. Thus, fetch of instruction can be executed efficiently.

According to another aspect of the invention, in a data flow type information processing apparatus having a program control portion, a paired data detecting portion, an operation processing portion and an external program storing portion, the program control portion is constructed in the following manner. A packet to be executed or a data flow program to be loaded in an external program storing portion is externally input to input means and an input/output control portion effects autonomous control as to output of the inputted data flow program to the external program storing portion, input of the data flow program read out from the external program storing portion, or input of the packet to be executed fetched by the external program storing portion. A data flow program is stored in a cache program memory and program data corresponding to the packet to be executed is outputted. A first control portion accesses the cache program memory according to address information included in the packet inputted from the input portion. A second control portion accesses the cache program memory at least two times consecutively for the address information included in the packet to be executed inputted from the input/output control portion and outputs the address information together with copy information. An output control portion controls, autonomously and selectively, the output of the packet to be executed, fetched by the cache memory and the packet to be executed, inputted from the input/output control portion and fetched by the external program storing portion.

Consequently, according to the present invention, when a data flow program is externally supplied, the program is uploaded in the external program storing portion and when a packet to be executed is supplied externally, the cache program memory is accessed two times consecutively to fetch different subsequent instructions consecutively to the address information included in the packet to be executed. The fetch instructions are outputted and if a mishit occurs in the cache program memory, data to be processed, together with the subsequent instructions, is fetched and outputted to the external program storing portion, whereby fetch of instructions can be executed efficiently by using the cache program memory and the external program memory.

In a preferred embodiment, the input/output control portion outputs, to the external program storing portion, an initial program of a predetermined number of words out of the data flow programs inputted in the input portion and stores the initial program in the cache program memory by means of the first control portion.

In addition, after the initial program of the predetermined number of words has been stored in the cache program memory, the input/output control portion outputs the remaining data flow programs only to the external program storing portion.

The first control portion is formed by: a write address designating portion for designating a write address of the cache program memory according to the address information included in the packet inputted in the input portion, a read address designating portion for designating a read address of the cache program memory according to the address information included in the packet inputted in the input portion, and an address adjusting portion for applying, to the cache program memory, the earlier outputted address signal from the write address designating portion or the read address designating portion.

The output control portion includes first and second comparison determining portions and an output portion. The first comparison determining portion determines a match between a packet to be executed, fetched by the cache memory and a packet to be executed, fetched by the external program storing portion and inputted through the input/output control portion. When the first comparison determining portion determines the match, the second comparison determining portion determines whether or not the program data is to be read out from the cache program memory. When the second comparison determining means determines the reading of the program data, the packet to be executed, fetched in the cache program memory is outputted. When the first comparison determining means determines a mismatch between the packet to be executed inputted in the cache program memory and the program data uploaded from the external program storing portion and stored in the cache program memory, a mismatch signal is provided to the output portion and the output portion sets a flag in the packet so that a subsequent instruction for the inputted packet to be executed can be fetched directly by the external program storing portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 11A, 11B and 11 C are block diagrams of an embodiment of the present invention: FIG. 11A shows the input portion of the program control portion, FIG. 11B shows the copy address generating portion of the program control portion.

DESCRIPTION OF THE PREFERRED EMBODIMENTS

Figure 1:
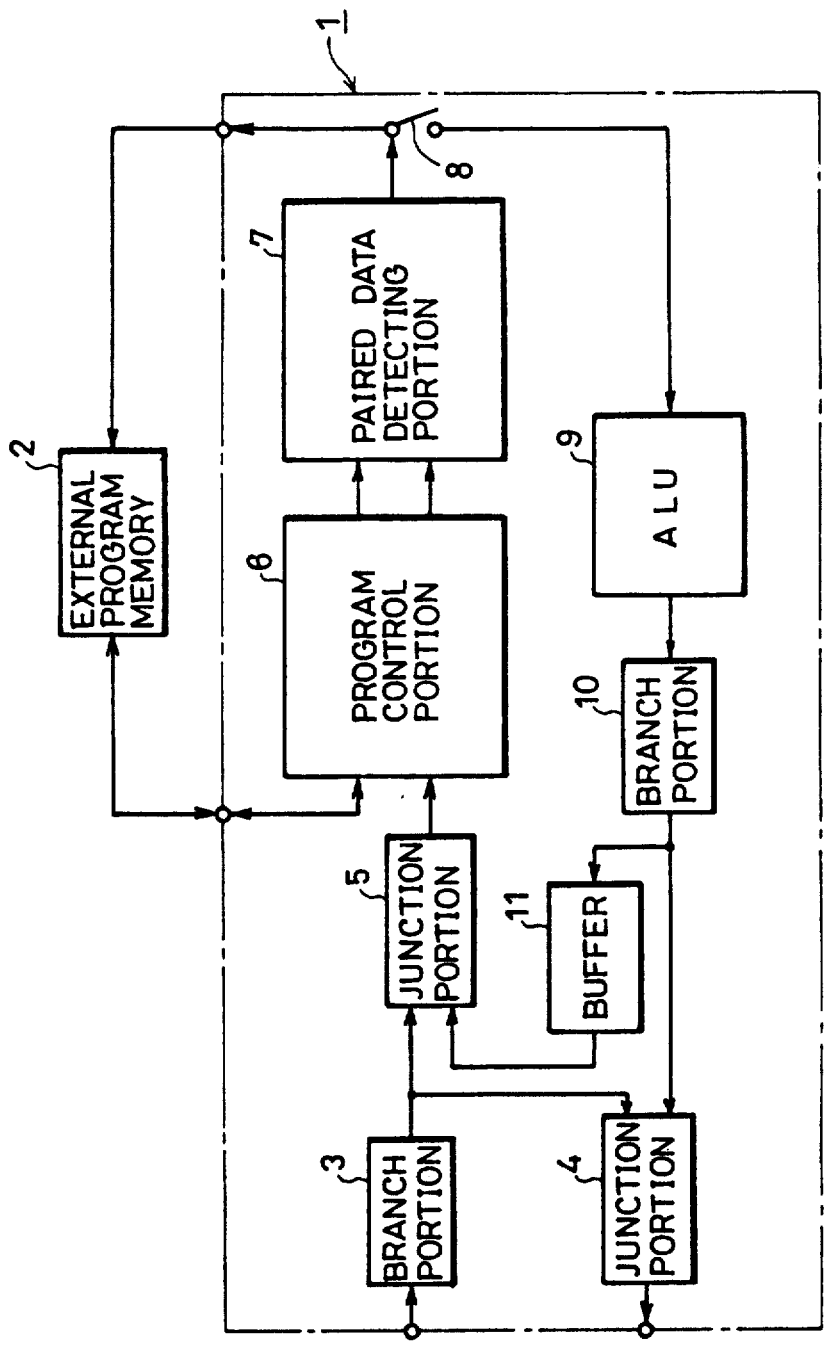
FIG. 1 is a schematic block diagram of a data flow type information processing apparatus to which the present invention is applied.

FIG. 1 is a schematic block diagram of an information processing apparatus to which the present invention is applied. First, referring to FIG. 1, the construction of the information processing apparatus will be described.

An external program memory 2 is provided externally to the information processing apparatus 1. The information processing apparatus 1 includes branch-/junction portions 3, 4, 5 and 10 and a buffer 11 which constitute an input/output control circuit. An input data packet is applied to the branch portion 3 and this input data packet is branched by the branch portion 3 and supplied to the junction portion 4 or 5. The junction portion 5 supplies either the input data packet outputted from the branch portion 3 or a data packet provided from the buffer 11 described later to a program control portion 6. The program control portion 6 stores key codes composed of combinations of nodes N and G/C (Generation/Color) and when a corresponding key code is inputted, the program control portion 6 outputs, to a paired data detecting portion 7, a tag and data to be processed indicating a destination node N# on the program and processing based on the destination node N#.

The paired data detecting portion 7 determines whether program data and data to be processed, which are to be paired, are inputted corresponding to the program data and the data to be processed, read out from the program control portion 7. When the paired program data and data to be processed are detected and generated in the paired data detecting portion 7, a contact 8 is closed. In the case of program data nop (no-operation), the contact 8 is also closed because program data to be paired is not required. An output of the paired data detecting portion 7 is also supplied to the external program memory 2. The program data and data to be processed outputted from the paired data detecting portion 7 are supplied to an ALU 9 through the contact 8, so as to be processed and the result of the processing is branched by the branch portion 10 and supplied to the buffer 11 or the junction portion 4. The result of the processing stored in the buffer 11 is supplied to the program control portion 6 through the junction portion 5.

The external program memory 2 reads out program data of the next instruction by using, as the key codes, the data N# and G/C included in the program data outputted from the paired data detecting portion 7 and uploads the data in the program control portion 6.

The above mentioned buffer 11 is provided to perform delay operation for the external program memory 2 to supply the result of the processing of the ALU 9 to the program control portion 6 after having read out the program data. The external program memory 2 is structured to enable initial writing (down-load) of program data from the program control portion 6.

Figure 2:
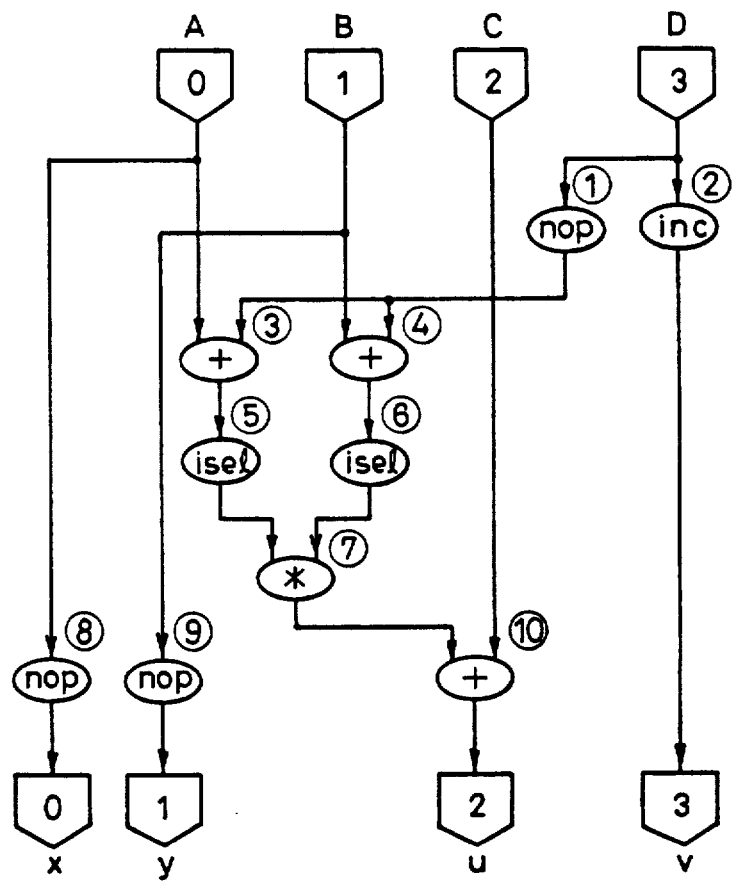
FIG. 2 is a diagram showing an example of a program to be processed by the data flow type information processing apparatus shown in FIG. 1.

FIG. 2 is a diagram showing an example of a program processed by the information processing apparatus shown in FIG. 1. FIGS. 3 to 10 are diagrams showing changes of program data in the respective components at the time of executing the program shown in FIG. 2.

Referring to FIG. 1 to 10, concrete operation of program processing by the image processing apparatus will be described. First, as is evident from the program of FIG. 2, the program data from the node N# A is desirably inputted to the program control portion 6 so that the nop instruction of data 0 is executed at a node ⑧ and that an additional instruction can be executed at a node ③ with data supplied from a node D and subjected to execution of an NOP instruction at a node ①.

Figure 3:
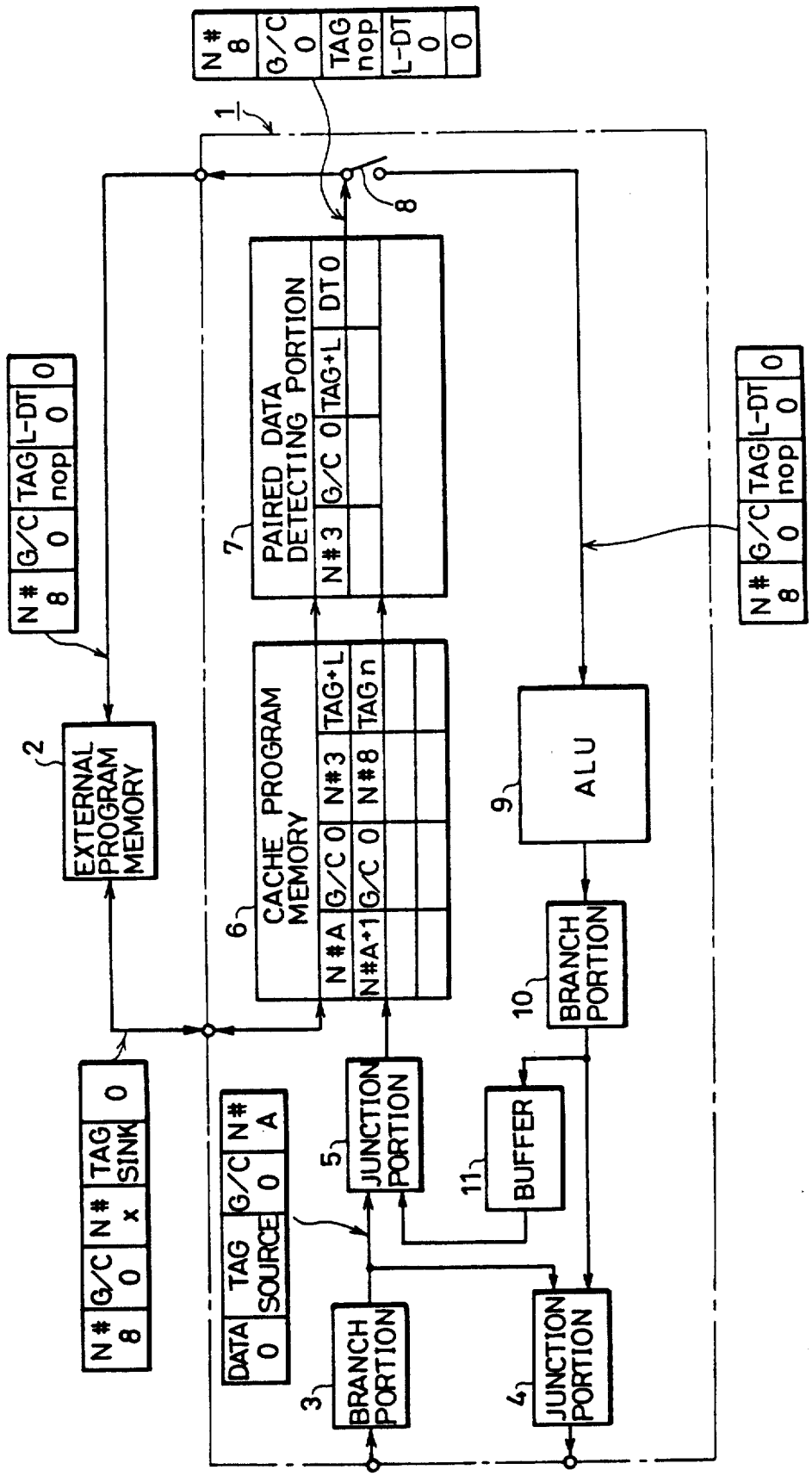
FIGS. 3, 4, 5, 6, 7, 8, 9, and 10 are diagrams for explaining execution procedures of program processing by the information processing apparatus shown in FIG. 1.
Figure 4:
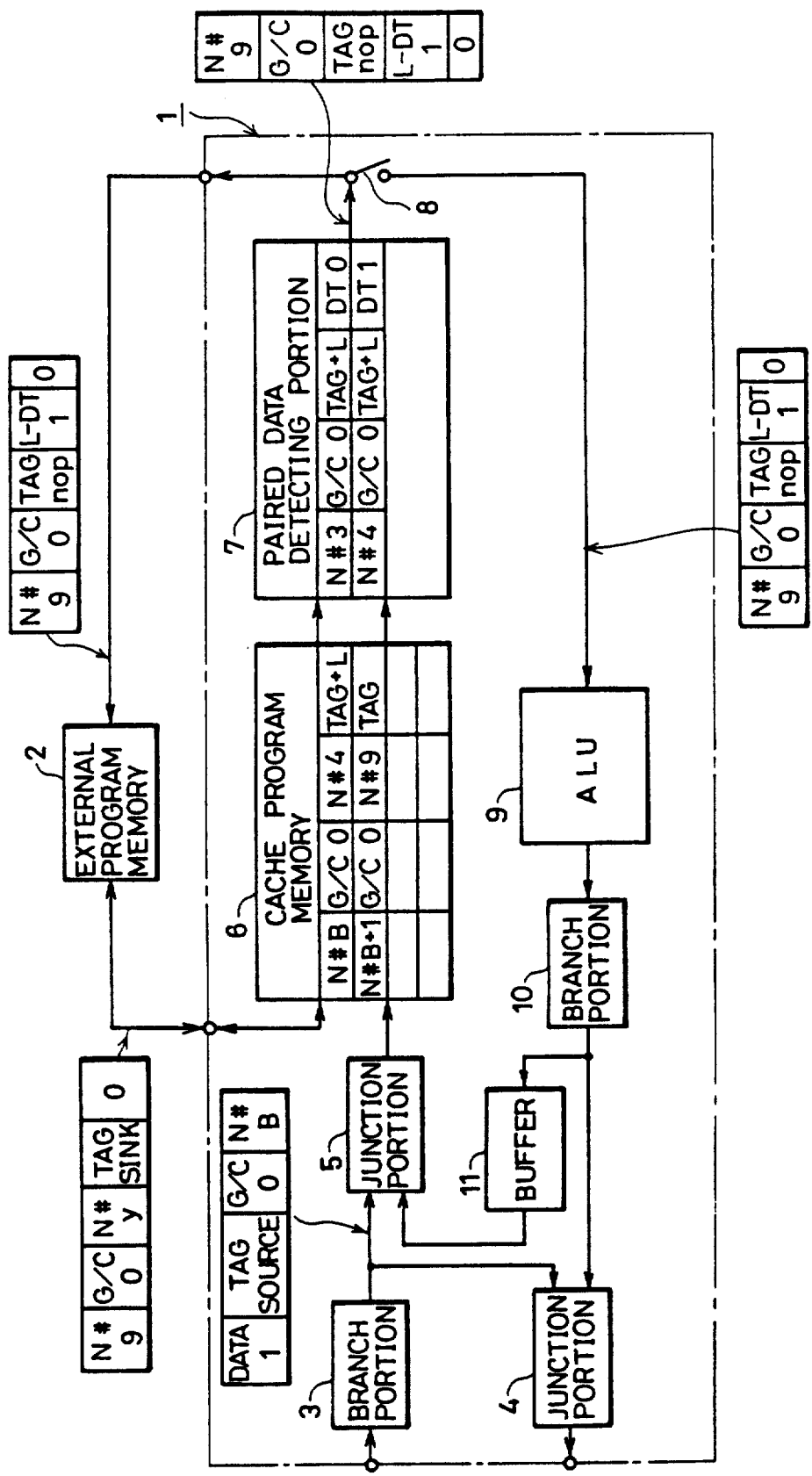

For those purposes, data 0, TAG source, G/CO and N#A are supplied as an input data packet to the information processing apparatus 1 as shown in FIG. 3. In this case, a combination of parts of the data N#A and G/CO indicates a physical address of the program control portion 6 and the data TAG source designates an input portion of the program data of the node N#A. The data G/C is used as an identifier for determining at what time the data 0 is sampled.

The data node N#A and G/CO are used as a key code for supplying the physical address of the program control portion 6 and accessing the memory. The above mentioned input data packet is supplied to the program control portion 6 through the branch/junction portions 3 and 5. The program control portion 6 accesses corresponding program data node N#A and G/CO as the key codes. For example, data node N#3 and TAG+L are fetched as the corresponding program data.

Those program data indicate the left input of addition in the node ③ for the program shown in FIG. 2. At this time, since the same data 0 for processing the nop instruction in the node ⑧ is supplied, a copy flag is set beforehand in the program control portion 6 corresponding to the key code of N#A and G/CO. Then, data N#8 and TAG nop indicating the nop instruction are fetched by the program control portion 6 corresponding to the key code of N#A and G/CO.

The program control portion 6 adds the data G/CO and the data 0 contained in the input data packet to the fetched program data of N#3 and TAG+L and adds thereto a flag 0 indicating that the data are normally fetched. If a mishit occurs, a flag 1 is added. The paired data detecting portion 7 determines whether the program data to be paired with the above mentioned program data has been fetched or not. More specifically, it is determined whether the data on the right side of the node ③ shown in FIG. 2 has been fetched or not. If the data on the right side of the node ③ is not, fetched, the paired data detecting portion 7 holds the program data in standby.

On the other hand, the program data for the nop instruction in the node ⑧ does not require program data to be paired and accordingly the program control portion 6 adds the data G/CO and the data 0 contained in the input data packet to the fetched data N#8 and TAG nop and adds the flag 0 indicating that the data is normally fetched. When the program data is fetched from the program control portion 6, the contact 8 is closed. Consequently, the program data for the nop instruction is supplied to the ALU 9 and to the external program memory 2.

In this case, it is assumed that a subsequent input data packet is supplied to the information processing apparatus 1. More specifically, data 1, TAG source, G/CO and N#B are supplied to the program control portion 6 through the branch/junction portions 3 and 5 as the program data for performing subsequent processing in the node B shown in FIG. 2. This program data is almost the same as the previously described data N#A shown in FIG. 3. Thus, the nop instruction of the data 1 is executed in the node ⑨ and the data 1 is added to the data supplied from the node D and obtained by execution of the nop instruction in the node ①.

For those purposes, in the same manner as described previously in connection with FIG. 3, the program control portion 6 fetches corresponding program data N#4 and TAG+L by using the data N#B and G/CO as the physical address of the memory and the key code. This program data is data at the left input of addition in the node ④ of the program shown in FIG. 2. Since the same program data 1 is supplied for processing the nop instruction in the node ⑨, a copy flag for the key code N#B and G/CO is set beforehand in the program control portion 6.

Accordingly, program data N#9 and TAG nop indicating a subsequent nop instruction using the same data N#B and G/CO as the key code are successively fetched. In addition, the data G/CO and the data 1 contained in the input data packet and the flag 0 indicating normal fetch are added to the program data N#4 and TAG+L fetched in the program control portion 6. Then, the paired data detecting portion 7 determines whether program data to be paired with the above mentioned program data has been already fetched or not. More specifically, it is determined whether the data on the right of the node ④ shown in FIG. 2 has been fetched or not. Since it is not fetched, the program data is held in standby.

On the other hand, while the above mentioned input data packet is inputted to the program control portion 6, the external program memory 2 reads out a next instruction from the address corresponding to a key code determined by the combination of N#8 and G/CO contained in the program data for the nop instruction supplied from the paired data detecting portion 7 as shown in FIG. 3. More specifically, in order to output the node N#x, the data to which processing of the nop instruction is applied in the node ⑧, the data N#8, G/CO, N#x and TAGsink are outputted to the program control portion 6.

Further, although the data for the nop instruction is supplied to the ALU 9, this program data is outputted, as is, since the nop instruction is an instruction indicating that any operation processing is not required. The program data for the nop instruction is supplied to the program control portion 6 through the branch portion 10, the buffer 11 and the junction portion 5.

The program data read out from the external program memory 2 is inputted to the program control portion 6 earlier than the data as the result of the processing of the nop instruction delayed through the buffer 11. Accordingly, the program control portion 6 can fetch the data N#x and TAGsink as the program data corresponding to the key code N#8 and G/CO contained in the packet indicating the result of the processing, as shown in FIG. 5, and subsequently it can fetch the data N#y and TAGsink as the program data corresponding to the key code N#9 and G/CO contained in the program data supplied through the buffer 11.

Figure 5:
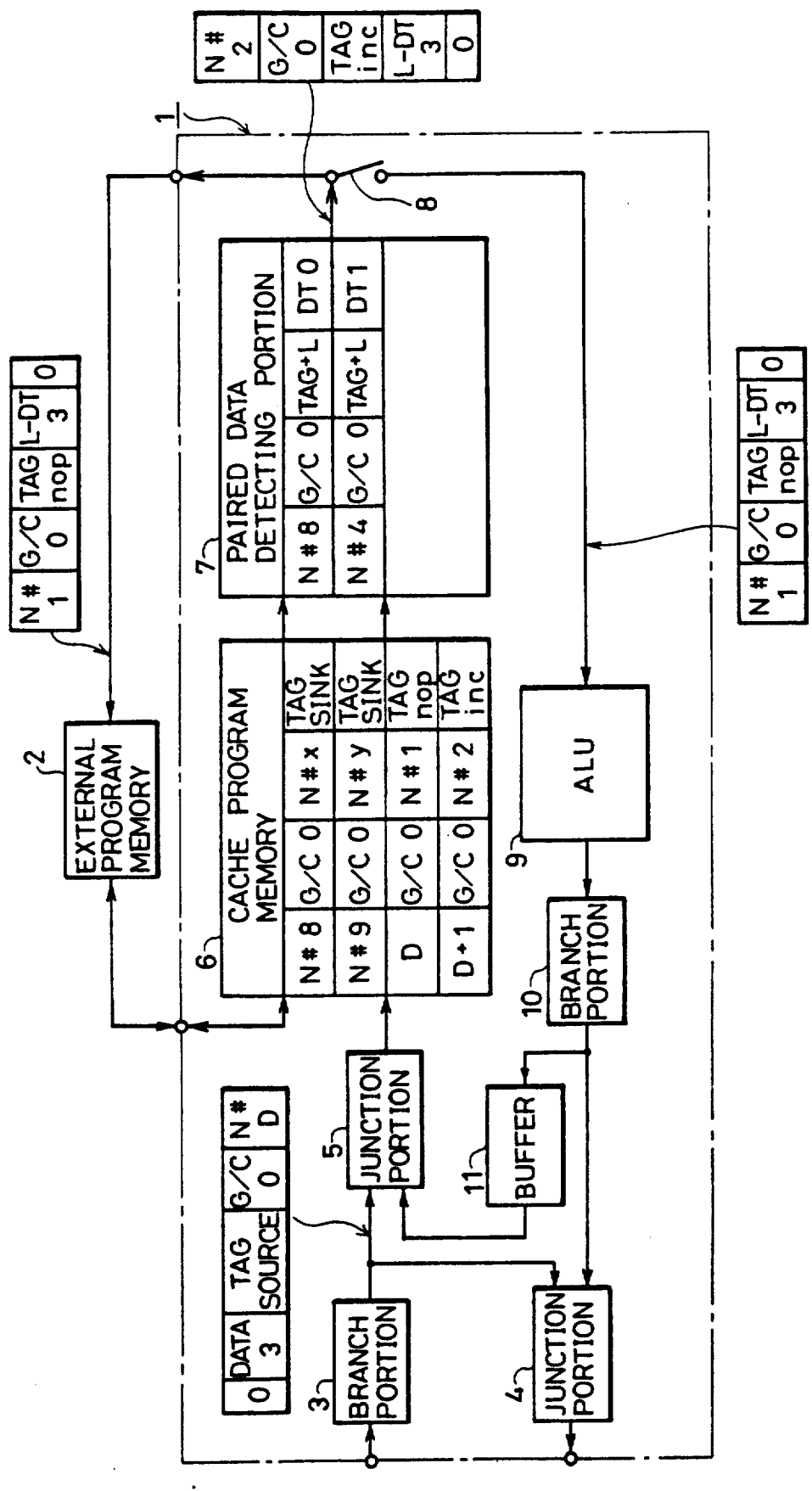

Then, data 3, TAG source, G/CO and N#D are supplied to the information processing apparatus 1 as the program data of the node D, as shown in FIG. 5. More specifically, the program data of the node D is used to execute the nop instruction in the node ① and an inc (increment) instruction in the node ② as shown in FIG. 2. For those purposes, the program control portion 6 fetches the program data N#1 and nop as the key code of N#D and G/CO contained in this program data and performs copy operation for the same key code N#D and G/CO, thereby to fetch corresponding program data N#2, inc. More specifically, the program control portion 6 adds the data G/CO and the data 0 contained in the input data packet and the flag 0 to the key code N#2 and TAGinc and outputs those data to the paired data detecting portion 7.

While those processing operations are executed, the external program memory 2 reads out program data N#9, G/CO, N#y, TAGsink corresponding to the key code N#9 G/CO and the program data is supplied to the program control portion 6. This program data indicates that the data as the result of the processing of the nop instruction in the node ⑨ shown in FIG. 2 is outputted to a node y.

Figure 6:
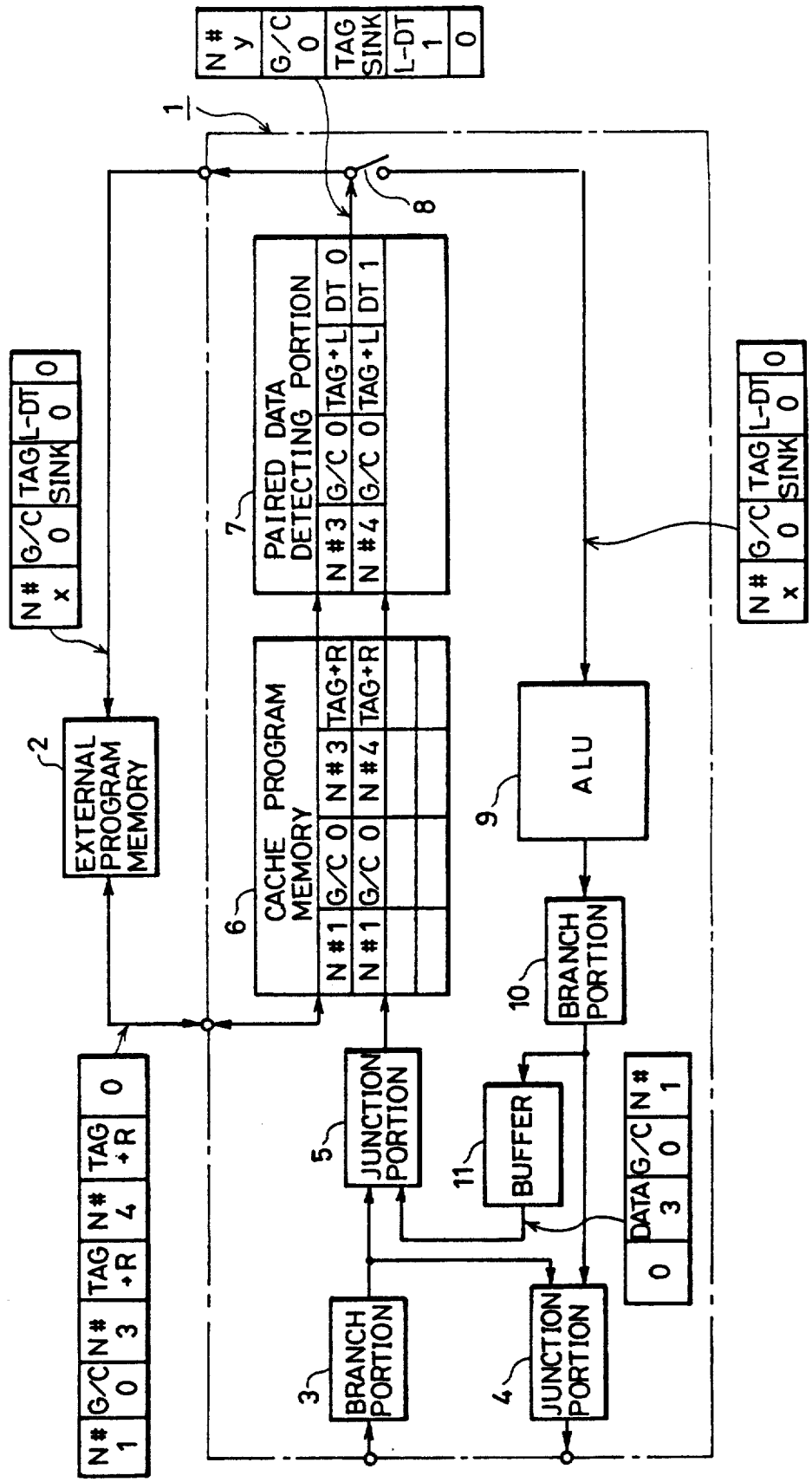
Figure 7:
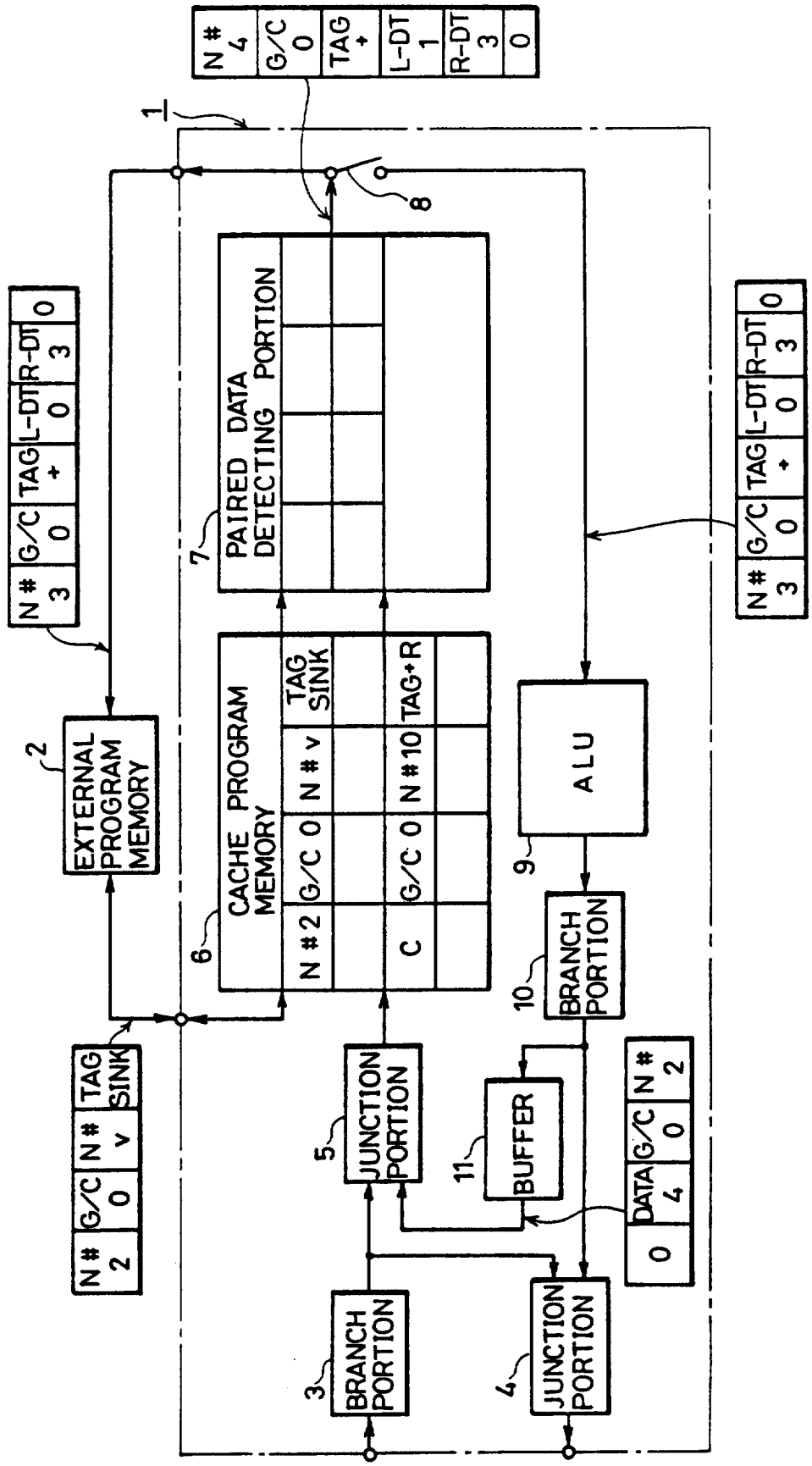
Figure 8:
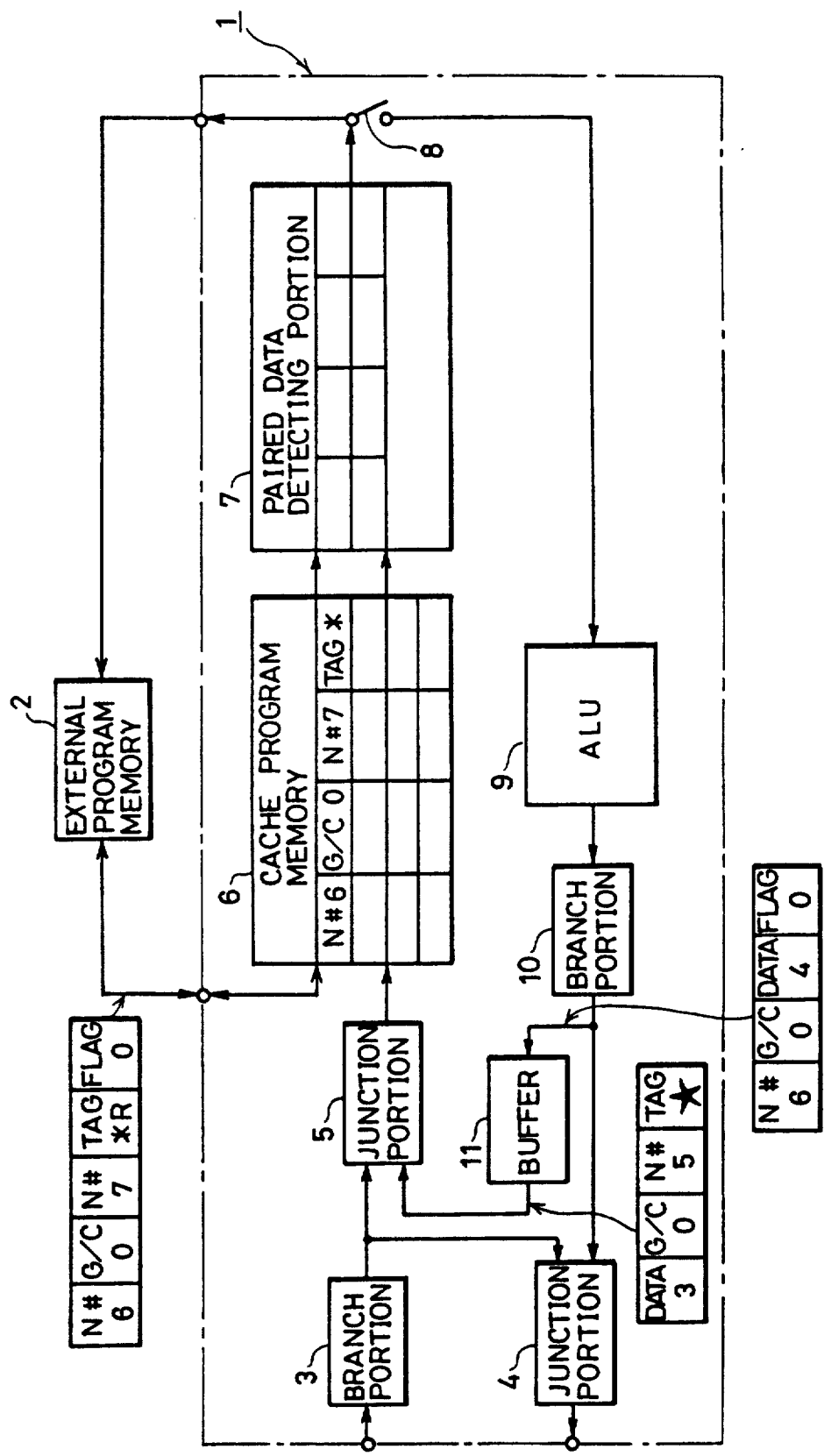

Since the program data including the data N#1, G/CO, TAG nop, L data 3 and the flag 0 shown in FIG. 5 is the nop instruction, the data to be processed is caused to pass through the ALU 9 and it is supplied to the program control portion 6 to the branch portion 10, the buffer 11 and the junction portion 5. The program control portion 6 fetches the data N#3, TAG+R as the key code N#1, G/CO of the program data as shown in FIG. 6. Then, the program control portion 6 supplies program data composed of N#3, G/CO, TAG+R, data 3 and the flag 0 to the paired data detecting portion 7.

The above described instructions can be fetched because the external program memory reads out successively corresponding two groups of program data of G/CO, N#3, TAG+R, N#4, TAG+R based on the key code N#1, G/CO of the program data composed of N#1, G/CO, TAG nop, L data 3 and the flag 0 shown in FIG. 5 and those instructions are supplied to the program control portion 6 before they are fetched. Therefore, the program control portion 6 also fetches data N#4, TAG+R as the key code N#1, G/CO of the program data and supplies the program data composed of N#4, G/CO, TAG+R and data 3 to the paired data detecting portion 7.

Thus, the data to be processed on the left of the node ③ and the data to be processed on the right of the node ④ shown in FIG. 2 are supplied to the paired data detecting portion 7. As described previously in connection with FIG. 3, the program data and the data to be processed on the left of the node ③ have been already supplied to the paired data detecting portion 7 and as described previously in connection with FIG. 4, the program data and the data to be processed on the left of the node ④ have been already supplied to the paired data detecting portion 7. Accordingly, the paired data detecting portion 7 detects existence of the two data to be processed in the node ③ and the two data to be processed in the node ④ and supplies first the program data composed of N#3, G/CO, TAG+L, data 0, R data 3 and the flag 0 is supplied to the ALU 9. As a consequence, the ALU 9 executes processing for addition in the node ③. In addition, the paired data detecting portion 7 supplies the program data composed of N#4, G/CO, TAG+L, data 1 and R data 3 to the ALU 9, where processing in the node ④ is executed.

As described previously, the ALU 9 executes the isel instruction in the nodes ⑤ and ⑥ as shown in FIG. 2 after the processing in the nodes ③ and ④. This isel instruction is an integer type read instruction. This instruction is the read instruction for the ALU 9 or the external data memory or the like, which is not shown.

Next, operation in the case of hash collision in the program control portion 6 at the time of executing the isel instruction will be described. In this example, a combination of N# and G/C is used as a key code for fetching program data. In this case, if N#5 and N#6 are represented by codes of four bits, they are "0101" and "0110" and they can be identified respectively. However, if more significant two bits for example are regarded as a key code and less significant two bits regarded as a physical address, both of the two bits are "01" and therefore the same. Thus, if the more significant two bits are used as the key code, the data N#5 and N#6 cannot be identified. Therefore, if the isel instruction of the node ⑥ is executed after the isel instruction is executed in the node ⑤ shown in FIG. 2, the ALU 9 executes the below described processing.

More specifically, when the ALU 9 executes the processing of the node ⑤, it outputs the result of the processing of N#5, G/CO, data 3 to the buffer 11. The program control portion 6 fetches data N#7, TAG*R corresponding to the key code N#5, G/CO. On the other hand, the ALU 9 executes processing of the isel instruction in the node ⑥ after it has executed the processing of the isel instruction in the node ⑤ and, it outputs the result of the processing, N#6, G/CO, data 4 to the buffer 11.

The program control portion 6 operates to fetch corresponding program data by using, as a key code, the first result of processing, N#5, G/CO. However, since the program control portion 6 cannot distinguish between N#5 and N#6, a next program data supplied from the external program memory 2 is initially written by using N#6, G/CO as a key code in addition to the program data supplied from the external program memory 2 by using N#5, G/CO as a key code and the program control portion 6 cannot fetch correct data corresponding to the key code N#5, G/CO, causing a mishit. It is necessary to perform normal operation even in such a case.

Figure 9:
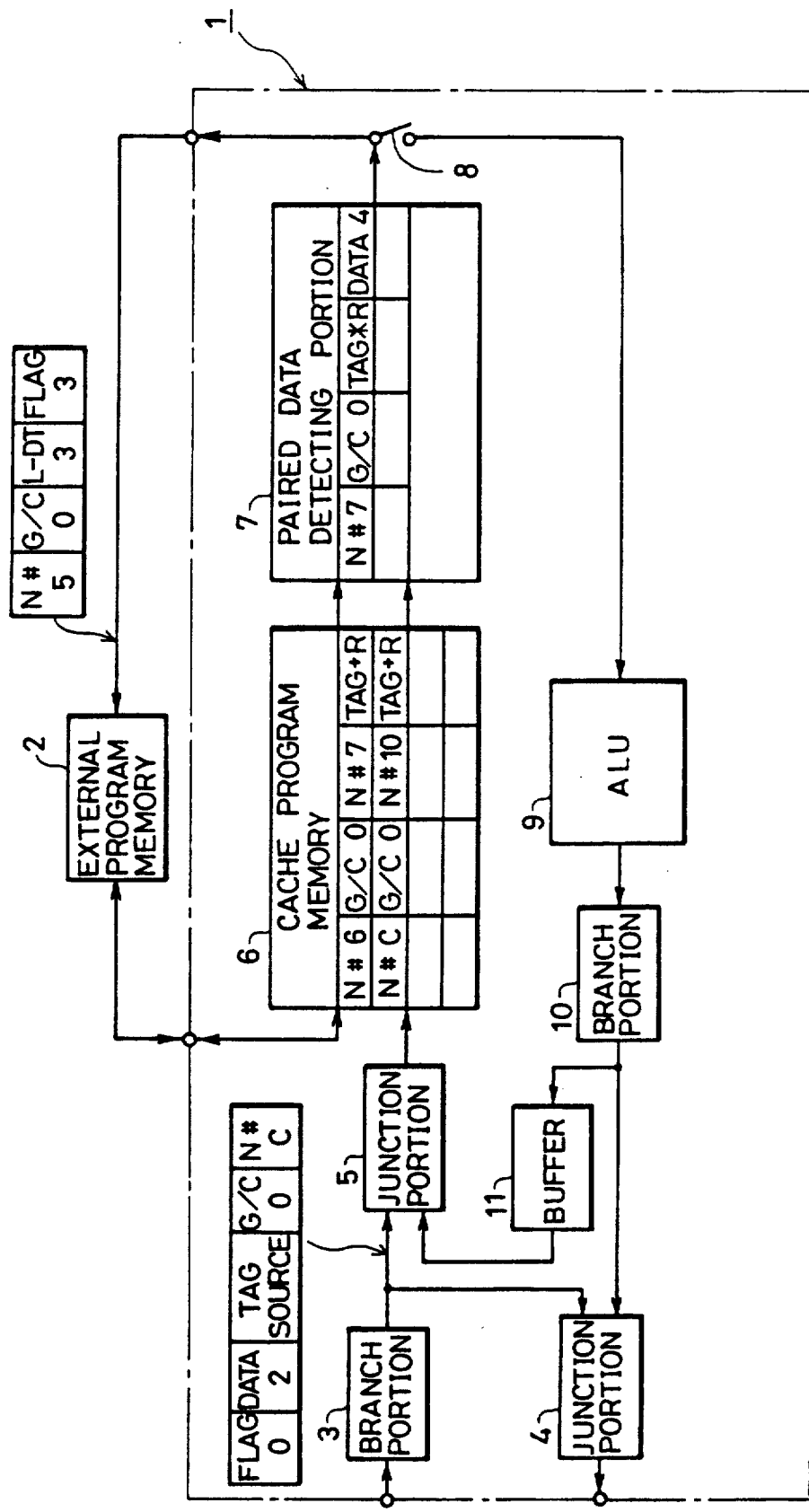

Therefore, according to this embodiment, when a mishit occurs, the program control portion 6 sets a mishit flag 3 in the program data as shown in FIG. 9, so as to indicate occurrence of a hash collision. The paired data detecting portion 7 does not close the contact 8 if the mishit flag is set in the program data. As a result, the program data outputted from the paired data detecting portion 7 is supplied only to the external program memory 2 and it is not supplied to the ALU 9.

Figure 10:
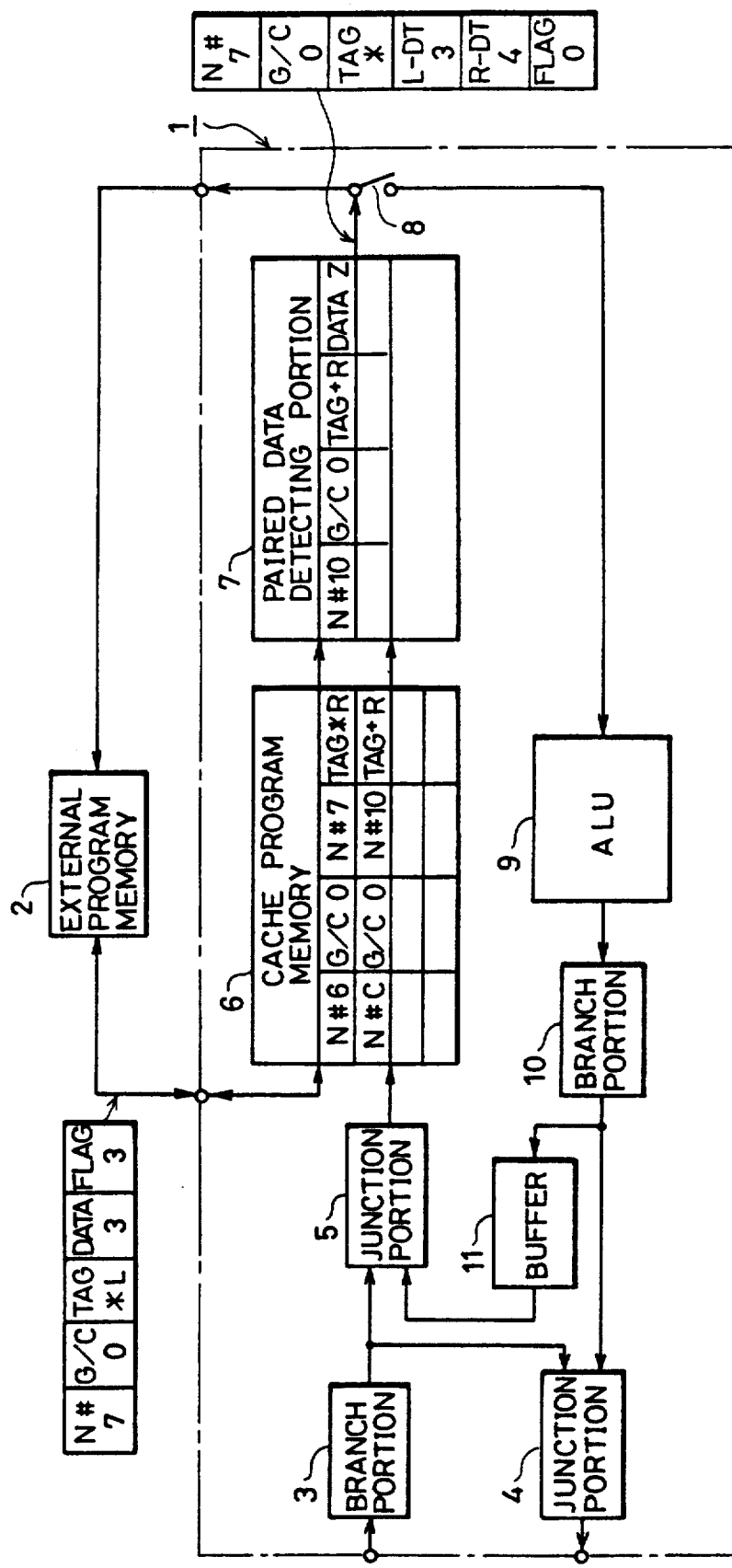

The external program memory 2 reads out program data N#7, G/CO, TAG*L for executing the instruction of the node ⑦ as shown in FIG. 10, based on the key code N#5, G/CO of the program data supplied from the paired data detecting portion 7 as shown in FIG. 9. On that occasion, the data 3 and the flag 3 to be processed inputted to the external program memory 2 are also outputted together with the program data.

More specifically, in this example, if a mishit occurs in the program control portion 6, the external program memory 2 is directly accessed and data together with the next instruction is supplied to the program control portion 6.

The program data of the node ⑦ read out from the external program memory 2 is supplied to the program control portion 6. However, since this program data contains data to be processed, it passes through the program control portion 6 according to the mishit flag and it is supplied to the paired data detecting portion 7. The paired data detecting portion 7 waits until data to be paired with the program data is inputted. After the external program memory 2 reads out directly the program data of the node ⑤, the program data of the node ⑥, composed of N#6, G/CO, TAGR and the flag 0 is inputted to the program control portion 6 as shown in FIG. 10.

The program control portion 6 fetches program data N#7, TAG*R using N#6, G/CO as a key code. This program data is supplied to the paired data detecting portion 7. The paired data detecting portion 7 detects existence of the two data necessary for executing the processing in the node ⑦ and closes the contact 8 again. Then, it supplies the two program data to the ALU 9 and executes the processing.

Subsequently, the same operation is carried out and processing for addition in the node ⑩ is performed based on the result of the processing of the node ⑦ and the program data inputted in the node C, whereby an output is provided to a node u.

As described above according to the embodiment of the invention, if a mishit of instruction fetch occurs in the cache program memory 6, the contact 8 is opened and the program of the next instruction is read directly from the internal program memory 2 and, at the same time, it is also supplied to the cache program memory 6. Consequently, even if the hash collision occurs, normal operation can be executed.

Figure 11A:
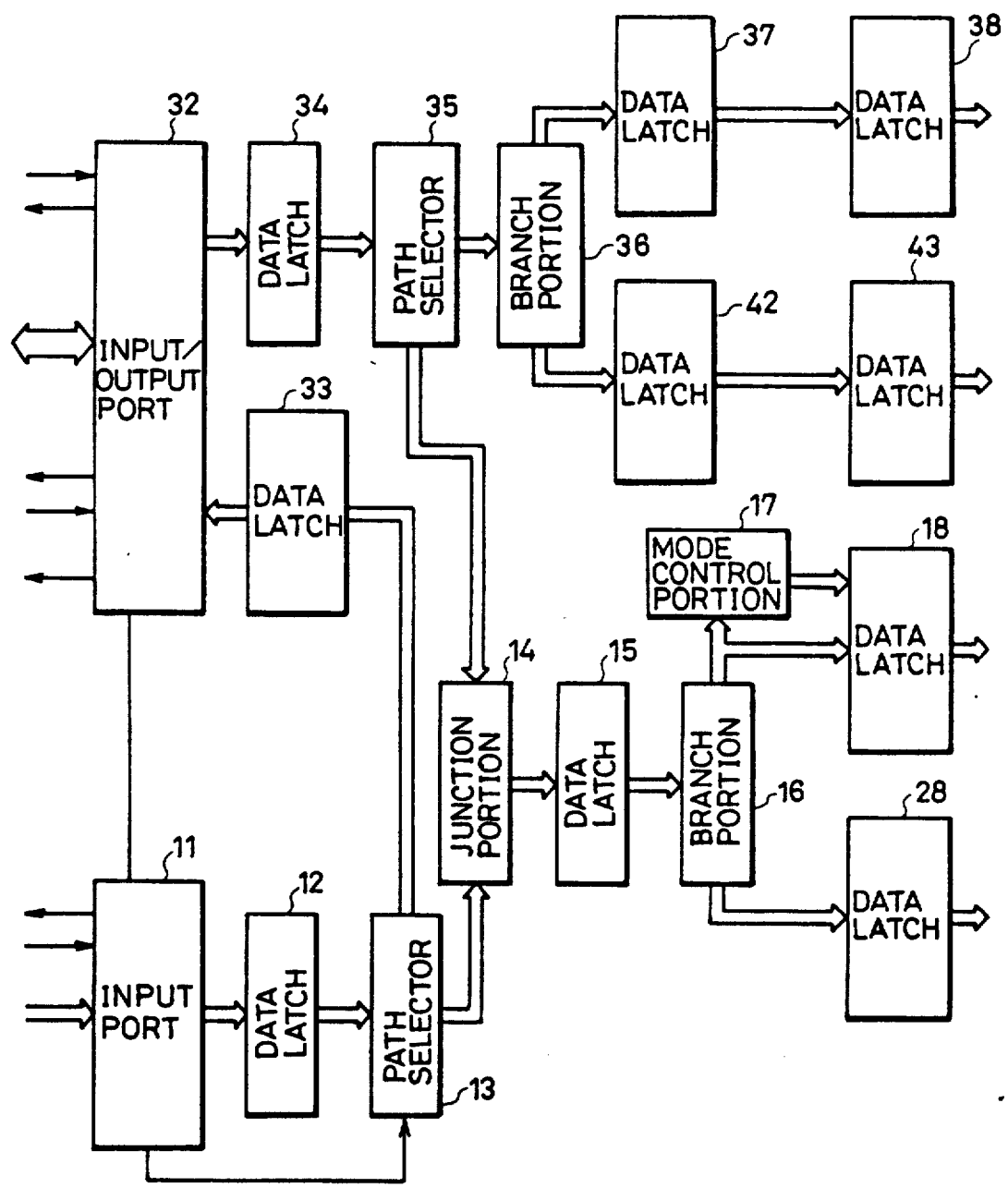
Figure 11B:
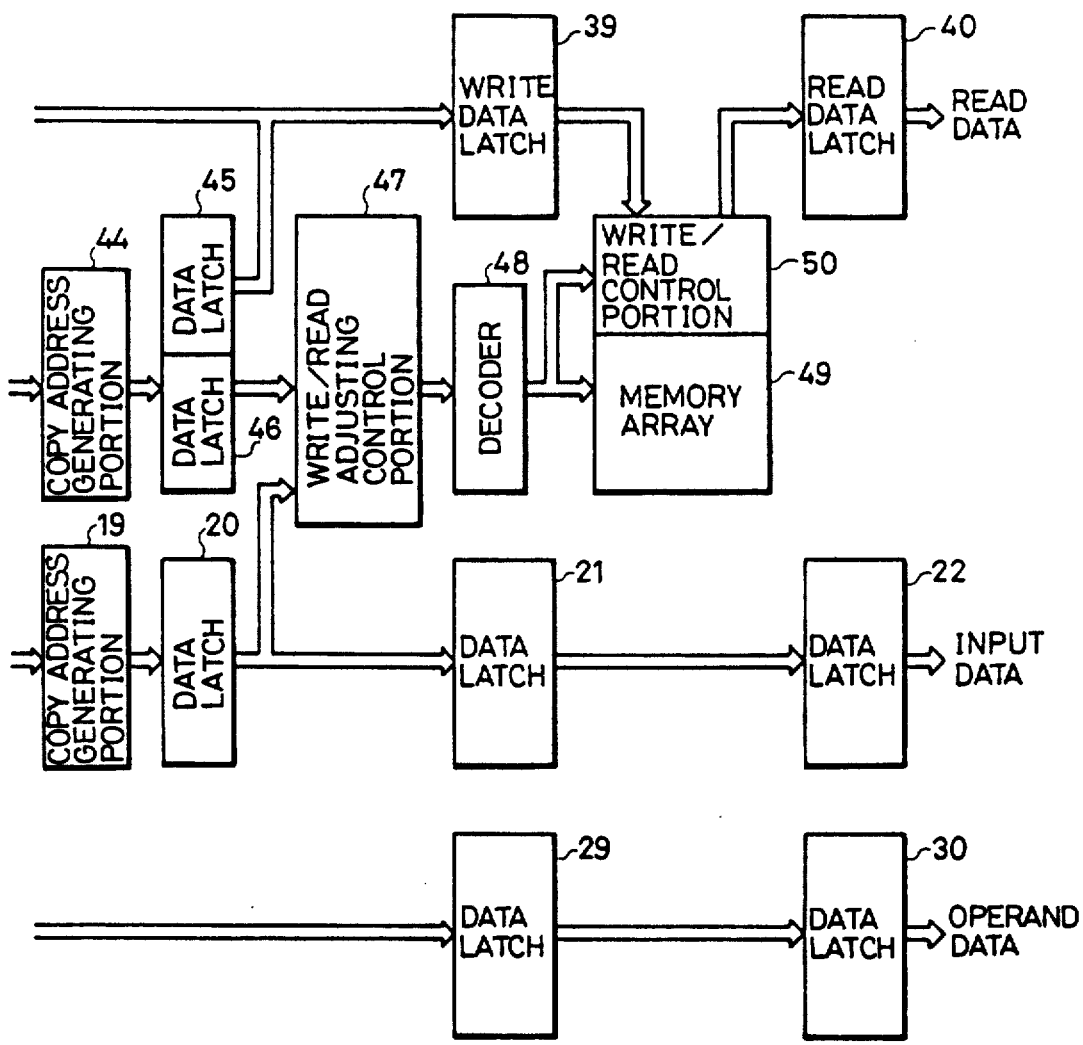
Figure 11C:
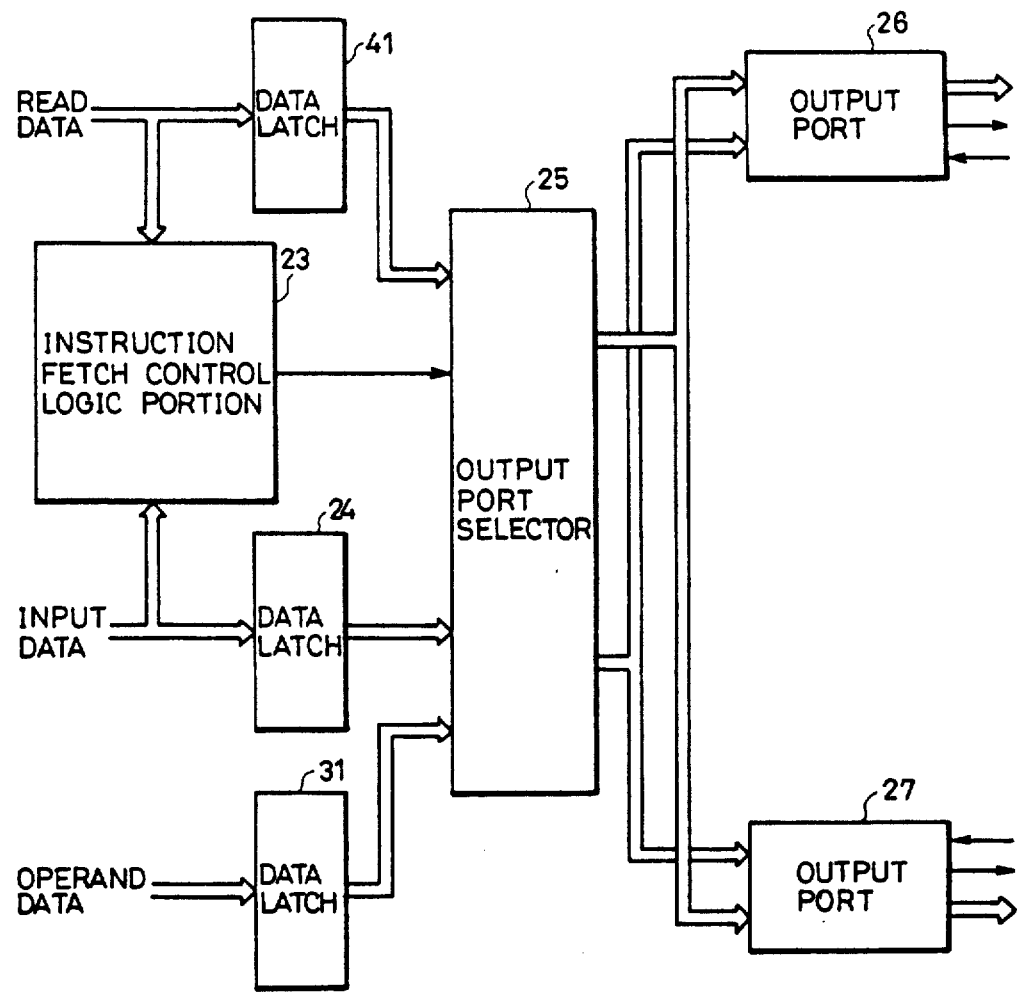
FIG. 11C shows the output portion of the program control portion.

FIGS. 11A to 11C are concrete block diagrams of the program control portion according to the embodiment.

Referring to FIGS. 11A to 11C, description will be made of the construction and the operation of the program control portion 6 in the case of loading externally inputted program data to the external program memory 2 and to the memory array 49. Program data are successively inputted externally and all the program data are loaded in the external program memory 2. The program data of initial 1k words out of those program data is also loaded in the memory array 49.

Program data includes any of the instructions ULD, LDI and LDX. ULD means "unload" and it represents a normal state of execution. LDI is an instruction to load the program data of initial 1k words in the memory array 49. LDX is an instruction to load the remaining programs in the external program memory 2. Those program data including the above mentioned instructions are supplied to the input port 11. The input port 11 supplies a selection signal to a path selector 13 according to each instruction. The input port 11 decodes an address of inputted program data and when it detects the address of 1k words, it supplies a detection signal to an input/output port 32. The input port 11 supplies the program data successively to a data latch 12. The data latch 12 is structured to output data by so-called handshake control in which data are shifted dependent on a vacant state of its first half stage. Data latches 15, 18, 20 etc. to be described later are also structured in the same manner.

The program data outputted from the data latch 12 is supplied to the path selector 13. The path selector 13 outputs the program data selectively to a junction portion 14 or a data latch 33 according to the selection signal supplied from the input port 11. More specifically, if the instruction contained in the program data is ULD, normal execution processing is performed and accordingly, the input data packet is outputted to the junction portion 14. If the instruction is LDI or LDX, the program data is outputted to the data latch 33 so that it is loaded in the external program memory 2. The data latch 33 latches the program data and then it supplies the program data to the input/output port 32. The input/output port 32 outputs the program data to external, thereby supplying it to the external program memory 2 and also outputting it to the data latch 34. When the input port 11 detects an address exceeding 1k words, the input/output port 32 outputs the program data only to the external program memory 2 and it does not output the program data to the data latch 34.

The instruction packet read out from the external program memory 2 is supplied to the input/output port 32. The program data latched in the data latch 34 is outputted to the path selector 35. The path selector 35 branches the program data selectively to the branch portion 36 or to the junction portion 14. More specifically; when the program data to be uploaded into the cache memory or externally applied initial load data is supplied, the input data packet is outputted to the branch portion 36 and when a data packet fetched in the external program memory 2 is supplied, the packet is branched to the junction portion 14.

When the data packet is supplied to the branch portion 36, key data composed of combination of N# and G/C contained in that data packet is latched in the data latch 42 as write address information and write data composed of N# and TAG contained in the data packet is latched in the data latch 37. The write address information latched in the data latch 42 is latched in the subsequent data latch 43. A copy address is formed by a copy address generating portion 44 based on the write address information latched in the data latch 43 and the key data of G/C and N# is latched in the data fetch 45 as a part of write data. The key code as the address information is latched in the data latch 46.

On the other hand, the write data latched in the data latch 37 is latched in the data latch 38 and this write data and part of the write data latched in the data latch 45 are latched in a write data latch 39. The write data latched in the write data latch 39 is supplied to a write/read control portion 50. The write address information latched in the data latch 46 is supplied to a write/read adjusting control portion 47. Read address information from the data latch 20 is also supplied to the write/read adjusting control portion 47 as will be described later. Then, the write/read adjusting control portion 47 selects either the write address information or the read address information which arrives earlier, and supplies the selected information to the decoder 48. If read address information is supplied to the write/read adjusting control portion 47 successively after the write address information has been supplied thereto, the write/read adjusting control portion 47 outputs the write address information to the decoder 48 and then outputs the read address information thereto. The decoder 48 decodes the write address information and the read address information and supplies column address information and row address information to the memory array 49. In the memory cell array 49, write data is written into a memory cell addressed by the write address information.

In the above described operation, program data of 1k words is written in the memory cell array 49 and when the input port 11 detects the addresses of 1k words, the input/output port 32 outputs thereafter program data only to the external program memory 2 and does not output the data to the data latch 34. In consequence, all the program data are loaded in the external program memory 2.

Next, practical program execution procedures will be described. An input data packet is supplied to the input port 11. This input data packet includes the information ULD indicating the normal execution state. The input port 11 determines the unloaded state by the instruction LCD and switches the path selector 13 to the side of the junction portion 14. Then, the input data packet is supplied only to the junction portion 14 through the data latch 12 and the path selector 13 and it is not outputted to the data latch 33. If the subsequent data latch 15 is vacant, the junction portion 14 latches the input data packet in the data latch 15. The input data packet latched in the data latch 15 is supplied to the branch portion 16, so that it is branched to a key code of N# and G/C and operand data. The key code is latched in the data latch 18 and it is also supplied to the mode control portion 17. The operand data latched in the data latch 28 is transmitted to the data latches 29, 30 and 31 successively.

The mode control portion 17 sets a damp mode for damping to determine whether program data is normal or not by reading out a program of 1k words loaded in the memory array 49, and a read mode for reading a corresponding instruction based on the key code from the memory array 49. If the read mode is set by the mode control portion 17, the key code latched in the data latch 18 is supplied to the copy address generating portion 19 and a copy address is generated to fetch different information for the same address information based on the key code and the same address information based on the key code and the same address information is latched successively in the data latch 20. The address information latched in the data latch 20 is supplied to the write/read adjusting control portion 47 and it is also latched in the data latch 21.

The write/read adjusting control portion 47 determines which arrives earlier, the read address information supplied from the data latch 20 or the write address information supplied from the data latch 46, as described above. If the read address information arrives earlier, the read address information is supplied to the decoder 48. The decoder 48 decodes the read address information and designates a specified address in the memory array 49. Program data of an instruction corresponding to N#, G/C contained in the input data packet is read out from the address designated in the memory array 49 and it is latched in the read data latch 40. This read data is supplied to an instruction fetch control logic portion 23 and it is also latched in the data latch 41.

On the other hand, the key code latched in the data latch 21 is latched in the data latch 22 and the output therefrom is supplied to the instruction fetch control logic portion 23 and it is also latched in the data latch 24. The instruction fetch control logic portion 23 determines whether the key code supplied from the data latch 22 matches the key code latched in the read data latch 40 and read out from the memory array 49. If the match is determined, a flag indicated whether program data is to be read out again from the memory array 49 subsequently to the key code is determined and if the flag is set, the read data latched in the data latch 41 is selected by the output port selector 25 and outputted to the output port 26. The program data subsequently read out is outputted to the output port 27 through the output port selector 25.

If a hash collision occurs in the memory array 49 as a result of a mishit for a predetermined instruction, the read key code latched in the read data latch 40 and the key code based on the input data packet latched in the data latch 22 do not match and accordingly the instruction fetch control logic portion 23 supplies a mismatch signal to the output port selector 25. When the mismatch signal is supplied, the output port selector 25 determines occurrence of the hash collision and selects the key code latched in the data latch 24 and the operand data latched in the data latch 31 and outputs the key code and operand data to the output port 26 without outputting the read data latched in the data latch 41.

Then, when a packet for execution of the next instruction fetched by the external program memory 2 is supplied to the input/output port 32, the input/output port 32 latches the packet in the data latch 34. The packet to be executed, latched in the data latch 34 is supplied to the path selector 35. When the path selector 35 determines the packet to be executed, fetched from the external program memory 2 according to the mishit flag, it outputs the packet to the junction portion 14 and latches it in the data latch 15. The branch portion 16 branches the packet to a key code and operand data and it latches the key code in the data latch 18 and latches the operand data in the data latch 28. In this case, since it is not necessary to read out program data from the memory array 49, the key code passes through the data latch 18, the copy address generating portion 19, and the data latches 20, 21, 22 and 24, and it is supplied to the output port selector 25. The operand data passes through the data latch 28 and the data latches 29, 30 and 31 and it is supplied to the output port selector 25. Then, the output port selector 25 outputs the key code and the operand data to the output port 26.

As described in the foregoing, according to the embodiment of the invention, when a data flow program is applied externally, the program is down-loaded in the external program memory 2 and when a packet to be executed is supplied externally, the cache program memory 49 including a different subsequent address is accessed twice consecutively with respect to the address information contained in the packet and the fetched instruction is outputted. If a mishit occurs in the cache memory 49, a subsequent instruction is fetched by the memory 2 and data to be processed contained in the inputted packet is outputted. Thus, the instruction can be fetched efficiently by the cache program memory 49 and the external program memory 2.

Figure 12:
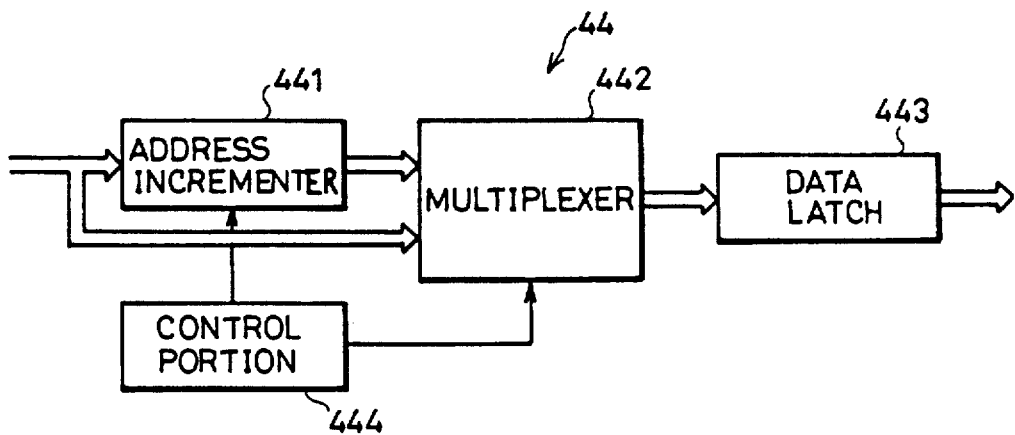
FIG. 12 is a block diagram of the copy address generating portion shown in FIG. 11B.

FIG. 12 is a diagram showing a concrete example of the copy address generating portion shown in FIG. 11B. Referred to FIG. 12, this copy address generating portion 44 will be described. The copy address generating portion 44 comprises an address incrementer 441, a multiplexer 442, a data latch 443 and a control portion 444. Write address information is supplied from the data latch shown in FIG. 11A to the address incrementer 441 and the multiplexer 442. The address incrementer 441 increments the write address information by one based on a control signal from the control portion 444. The output of the address incrementer 441 is supplied to the multiplexer 442. The multiplexer 442 outputs the write address information or the incremented write address information based on the control signal of the control portion 444.

Figure 13:
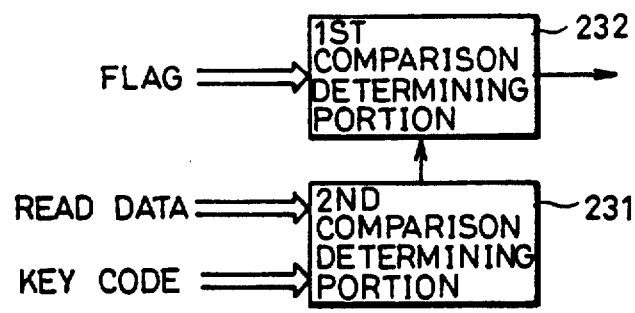
FIG. 13 is a block diagram showing a concrete example of the instruction fetch control logic portion shown in FIG. 11C.
Figure 14:
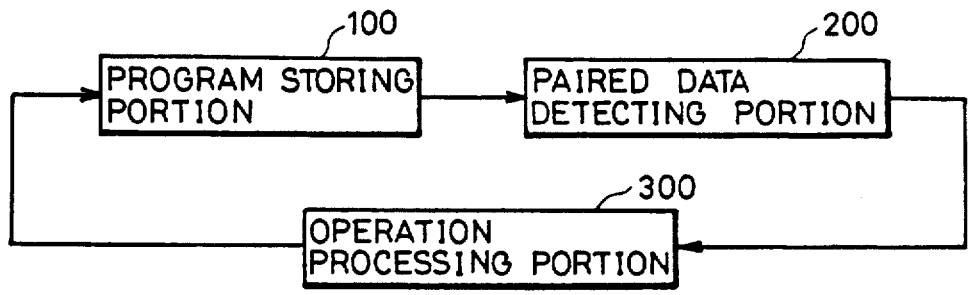
FIG. 14 is a schematic block diagram of a conventional data flow type computer.
Figure 15:
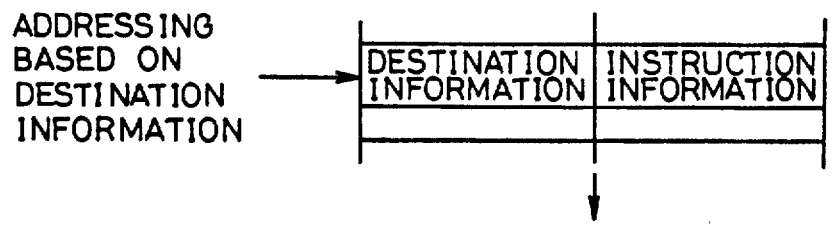
FIG. 15 is a diagram showing part of a content stored in a program memory.
Figure 16:
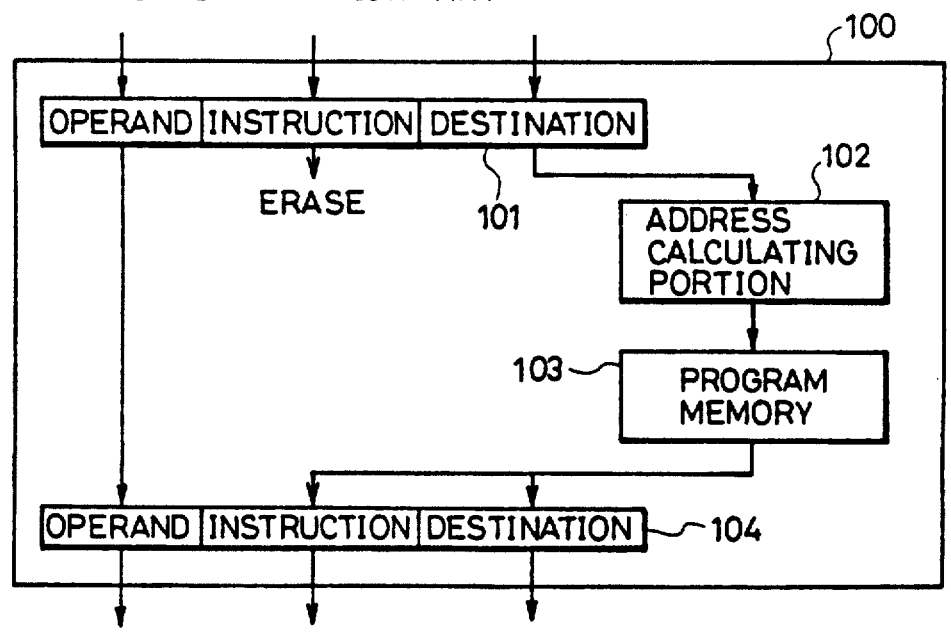
FIG. 16 is a diagram showing a schematic construction of the program storing portion shown in FIG. 14.

FIG. 13 is a block diagram showing a concrete example of the instruction fetch control logic portion shown in FIG. 11C. The instruction fetch control logic portion 23 comprises a first comparison determining portion 231 and a second comparison determining portion 232. The first comparison determining portion 231 compares a key code contained in the read data latched in the read data latch 40 shown in FIG. 11B with a key code latched in the data latch 22 and determines whether those key codes match or not. The second comparison determining portion 232 determines a flag indicating whether program data is to be read out again or not, when the first comparison determining portion 231 determines the match between the read data and the key code.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processing apparatus comprising:

program control means for storing data flow programs in a memory, used to control said data flow type information processing apparatus, and fetching instructions of a data flow program from the memory according to input data to be processed;

paired data detecting means for determining whether an instruction of the data flow program, and the input data to be processed, which are to be paired, are input from said program control means;

operating processing means for executing the instruction of the data flow program based on the input data to be processed, if the instruction of the data flow program and the input data to be processed were paired by said paired data detecting means to provide an operational processing result; and external program storing means capable of supplying the data flow program to said program control means;

said program control means including, program storing means for storing the data flow program, means for fetching a subsequent instruction of the stored data flow programs from a cache program memory to operate on the operation processing result of said operation processing means and accessing, together with the input data to be processed, said subsequent instructions directly from said cache program memory, and means for accessing said external program storing means when said paired data detecting means determines that the instruction of the data flow program, to be paired is read out from said program storing means and that the input data to be processed exists, and transmitting the instruction for the data flow program and the input data to be processed to said operation processing means.

2. A data flow type information processing apparatus comprising:

program storing means for storing data flow programs used to control said data flow type information processing apparatus in a memory;

paired data detecting means for determining whether a data flow program and input data to be processed, which are to be paired, are input from said program storing means;

operation processing means for executing the data flow program based on the input data to be processed, when the data flow program and the input data to be processed have been paired by said paired data detecting means to produce an operational processing result; and a program execution control system including external program storing means for providing the data flow program to said program storing means and accessing said program storing means, access to said external program storing means being executed when said paired data detecting means determines that the paired data flow program and input data to be processed, are read out from said program storing means said data flow program and input data to be processed being transmitted to said operation processing means, so that a subsequent instruction of the data flow program is fetched by said program execution control system from a cache program memory to operate on the operation processing result of said operation processing means and said subsequent instruction being directly accessed by said program execution control system, together with the input data to be processed, from said external storing means, when a mishit occurs in fetching of the subsequent instruction.

3. A data flow type information processing apparatus comprising:

program control means for storing data flow programs, used to control said data flow type information processing apparatus in a memory, and fetching an instruction from a data flow program from the memory according to input data to be processed;

paired data detecting means for determining whether an instruction from the data flow program, and the input data to be processed, which are to be paired are inputted from said program control means;

operation processing means for executing the instruction of the data flow program based on the input data to be processed, when the instruction of the data flow program and the input data to be processed were paired by said paired data detecting means; and external program storing means for supplying the data flow program to said program control means; said program control means including, input means for receiving the data flow program and for loading the input data to be processed from or into said external program storing means, input/output control means for autonomous control separate from said program control means for selecting an output of the data flow program to be input to said input means and to said external program storing means, for selecting an input of the data flow program read out from said external program storing means, or for selecting an input of the input data to be processed to be fetched by said external program storing means, a cache memory for storing the data flow program and outputting corresponding program data to said input/output control means according to the input data to be processed, first control means for accessing said cache memory according to address information contained in the input data to be processed, input from said input means or said input/output control means, said control means for accessing said cache memory at least twice consecutively and outputting, together with copy information, the address information contained in the input data to be processed, input from said input means or said input/output control means, and output control means for autonomous control separate from said program control means, for selectively outputting the input data to be processed, which was fetched by said cache memory and the input data to be stored by said external program storing means.

4. A data flow type information processing apparatus in accordance with claim 3, said input/output control means further comprising:

means for outputting an initial program of a predetermined number of words from the data flow program input into said input means to said external program storing means and storing the initial program in said cache memory by said first control means.

5. A data flow type information processing apparatus in accordance with claim 4, said input/output control means further comprising:

means for outputting subsequent data flow programs only to said external program storing means, after the initial program of the predetermined number of words is stored in said cache memory.

6. A data flow type information processing apparatus in accordance with claim 4, said input/output control means further comprising:

write address designating means for designating a write address in said cache memory according to address information included in the input data to be processed inputted to said input means and for producing a write address signal from the designated write address;

read address designating means for designating a read address in said cache memory according to the address information included in the input data to be processed inputted in said input means and for producing a read address signal from the designated read address; and address adjusting means for supplying, to said cache memory, the read or write address signal outputted from said write means designating means or said read address designating means.

7. A data flow type information processing apparatus in accordance with claim 3, said second control means and said output control means comprising:

first comparison determining means for determining a hit between the input data to be processed fetched by said cache memory and the input data to be processed fetched by said external program storing means and inputted from said input/output control means, second comparison determining means for determining whether program data is to be read out from said cache memory upon determination of the hit by said first comparison means, and output means for outputting the input data to be processed fetched by said cache memory to said output control means when said second comparison determining means determines that program data is to be read out.

8. A data flow type information processing apparatus in accordance with claim 7, said first comparison determining means comprising:

means for supplying a mishit signal to said output means when the mishit between the input data to be processed fetched by said cache memory and the input data to be processed fetched by said external program storing means is determined, and said output means including means for outputting the input data to be processed fetched by said external program storing means when said mishit signal is provided.

* * * * *